Figure 1:
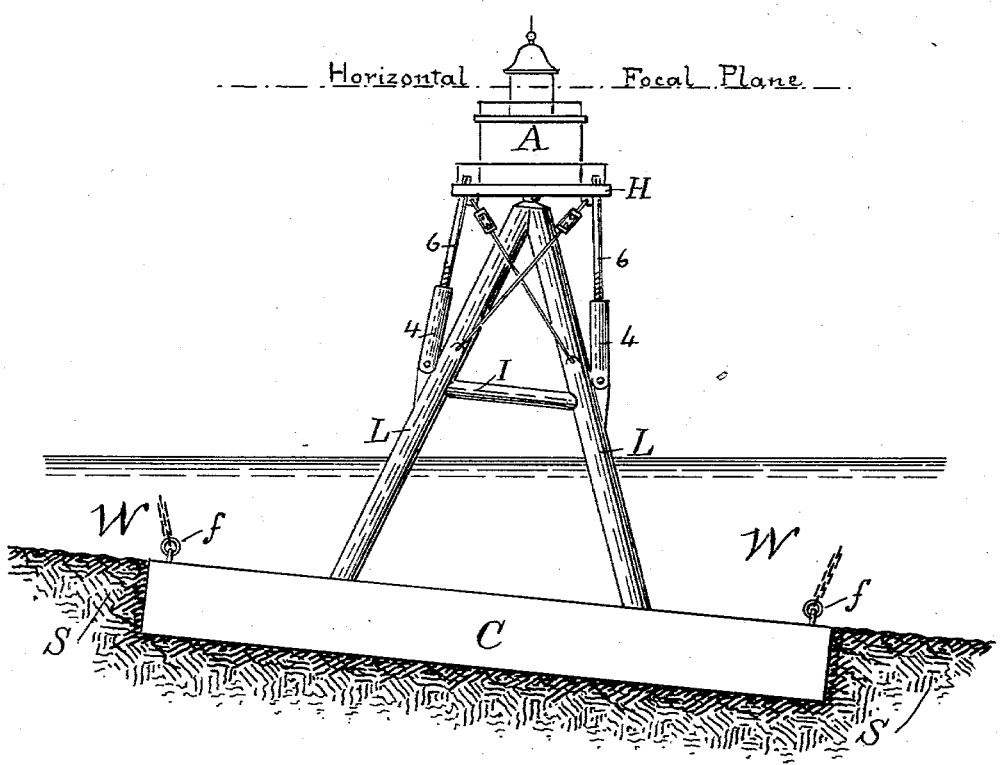

No. 720,998. PATENTED FEB. 17, 1903.
E. BECKER.
MARINE STRUCTURE.
APPLICATION FILED OCT. 28, 1902.
NO MODEL. 7 SHEETS—SHEET 1.

Witnesses: Inventor:

No. 720,998. PATENTED FEB. 17, 1903.
E. BECKER.
MARINE STRUCTURE.
APPLICATION FILED OCT. 28, 1902.
NO MODEL. 7 SHEETS—SHEET 2.

Witnesses: Joseph Becker, Jno. M. Meany

Inventor: Edmund Becker

No. 720,998. PATENTED FEB. 17, 1903.
E. BECKER.
MARINE STRUCTURE.
APPLICATION FILED OCT. 28, 1902.
NO MODEL. 7 SHEETS—SHEET 3.

Witnesses: Inventor:

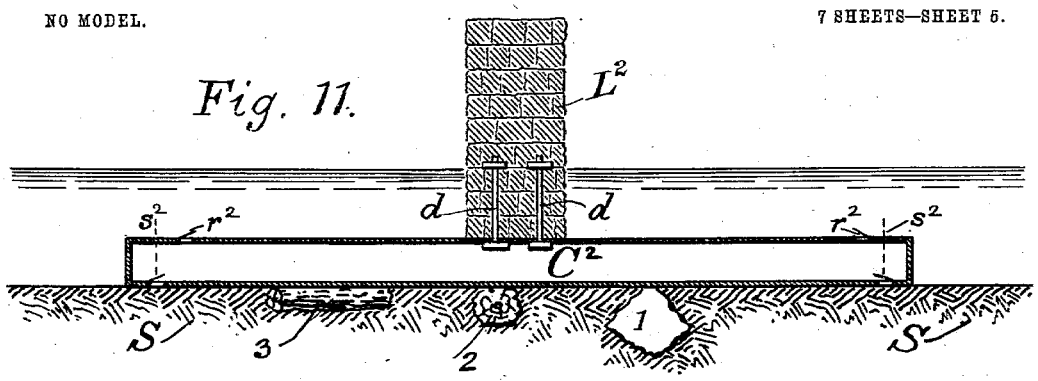
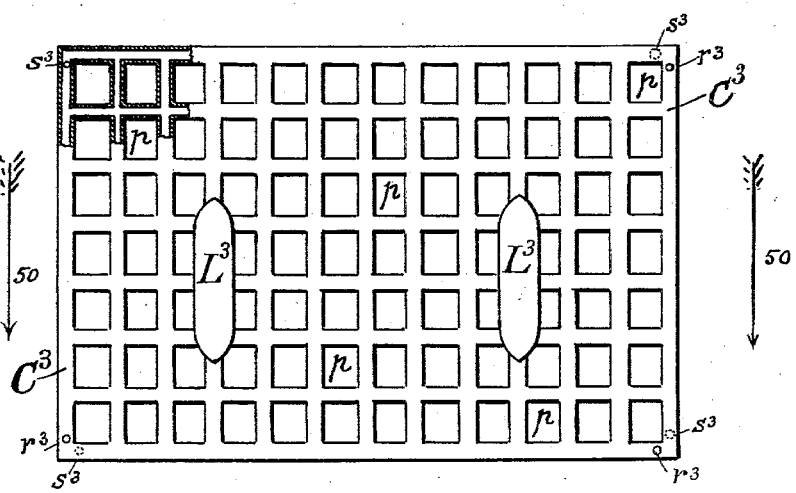
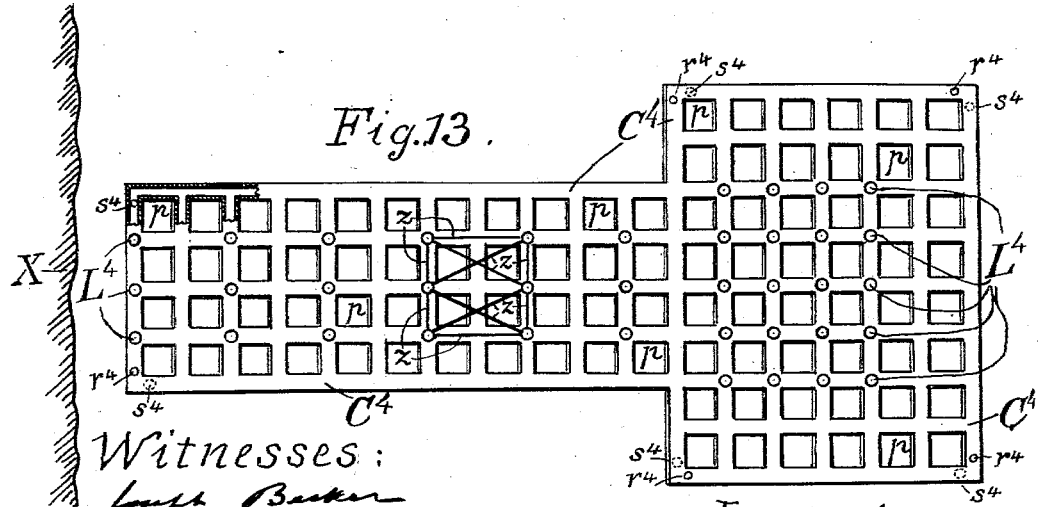

No. 720,998. PATENTED FEB. 17, 1903.
E. BECKER.
MARINE STRUCTURE.
APPLICATION FILED OCT. 28, 1902.

NO MODEL. 7 SHEETS—SHEET 6.

Witnesses:
Joseph Becker
Jno. T. Meany

Inventor:
Edmund Becker

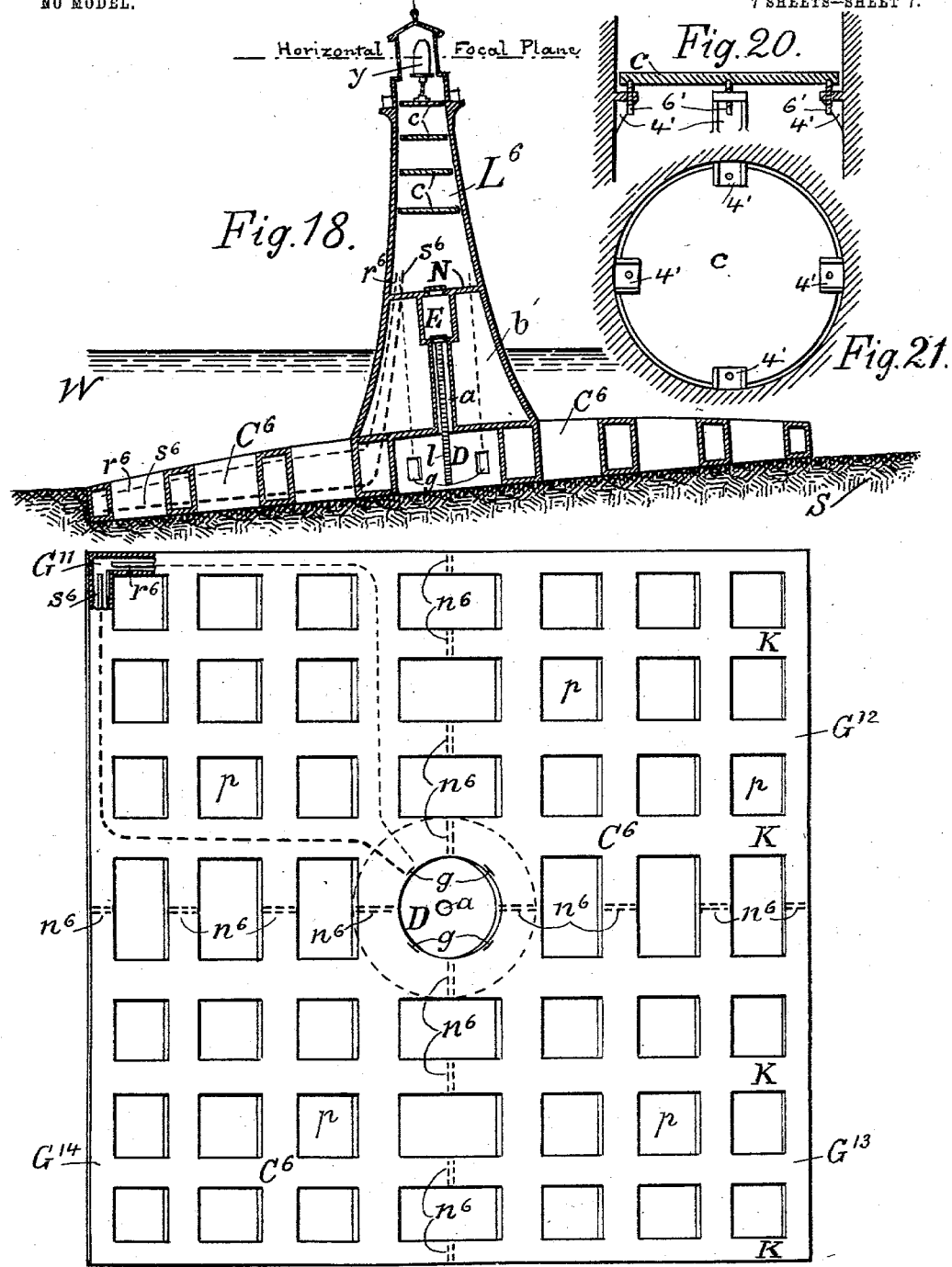

UNITED STATES PATENT OFFICE.

EDMUND BECKER, OF WASHINGTON, DISTRICT OF COLUMBIA.

MARINE STRUCTURE.

SPECIFICATION forming part of Letters Patent No. 720,998, dated February 17, 1903.

Application filed October 28, 1902. Serial No. 129,151. (No model.)

*To all whom it may concern:*

Be it known that I, EDMUND BECKER, a citizen of the United States, residing at Washington, District of Columbia, have invented certain new and useful Improvements in Marine Structures, of which the following is a specification.

My present invention is a modification of that described and claimed in my prior application, filed May 10, 1902, since become Patent No. 710,658. Its main object is to permit of doing away with part or all of the "excavating operation" which is given in my said patent as the fifth step of the method.
The fundamental principle of my invention is that only certain parts of the structure need be righted and that these can be righted by adjusting them angularly upon the rest of the structure, which I preferably make rigid throughout. With the aid of this principle the operation of excavating can, if desired, be entirely dispensed with, and this for the following reasons: Whatever the circumstances may be, either there is scour or there is no scour. According to my said patent, where there is no scour excavating is not necessary except for the purpose of arighting the structure. According to the same patent, where scour does exist any sinking into the soil that may be necessary to render the foundation unscourable will take place automatically, and here again excavating is not required except for the purpose of arighting. Therefore in my patent above mentioned, where the whole structure is rigid and hence stable, even when inclined, excavating is not strictly necessary except for the purpose of arighting. As arighting in the present application may be accomplished solely by adjustment, it is seen that excavating may, as stated above, be entirely dispensed with. However, I prefer to excavate as much as is necessary to avoid any great leaning of the rigid part of the structure to accelerate automatic sinking and to secure in the first instance a firm seat in the soil, thus reducing the chances of subsequent settling. As no excavating is required, the base of the structure could be solid and continuous or of any other construction that would best suit the particular case; but as I prefer to excavate to a certain extent as a general rule I make the base or footing with openings that pass vertically through it and which permit of remov-
ing any obstructions that might prevent the structure from taking a firm seat and which also permit of aiding by scooping, pumping, or equivalent process the operation of automatic sinking. These perforated footings are preferably made in the shape of a grillage, the girders of which may be solid to be floated with auxiliary floats or the girders of which may be hollow to form hermetically-closed air-chambers. By judiciously buoying certain parts of the footing with air and ballasting opposite parts with water only or with water and removable solid ballast any tendency the structure may have to settle too unevenly can be successfully counteracted. At any time after erection the structure when made buoyant is easily raised to change its location or to remove it to a place of safety during the winter season when the tower is to be used as a substitute for light vessels in places where such vessels have to be removed to a safe anchorage during winter. In fact, my structure may be considered as a light vessel grounded instead of moored, and therefore requiring no crew.

My invention further consists in features and details of construction the nature and object of which will be given later.

Figure 2:
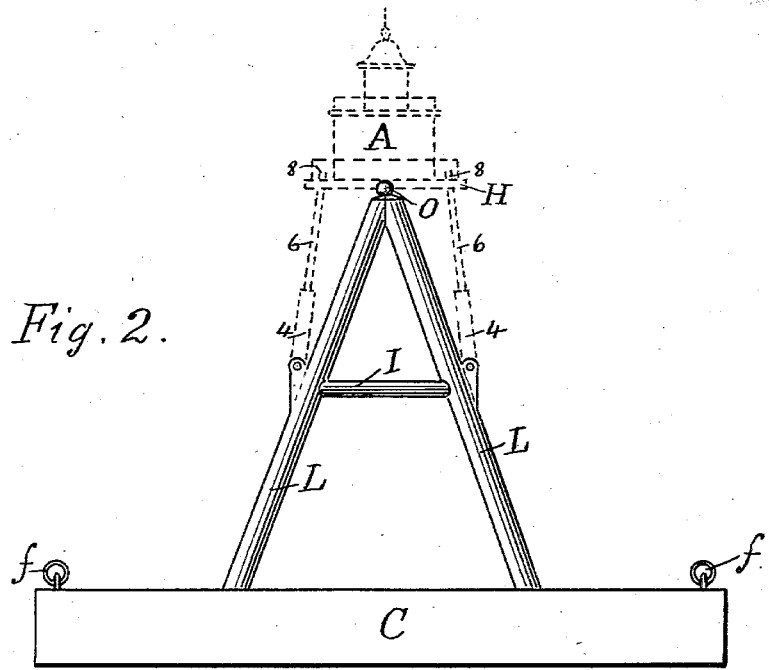
Figure 3:
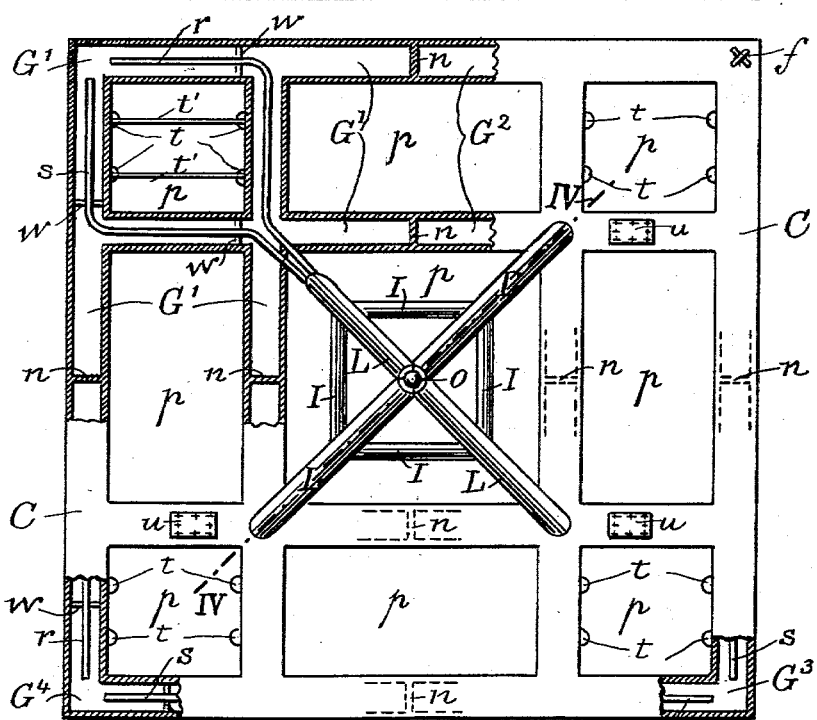
Figure 4:
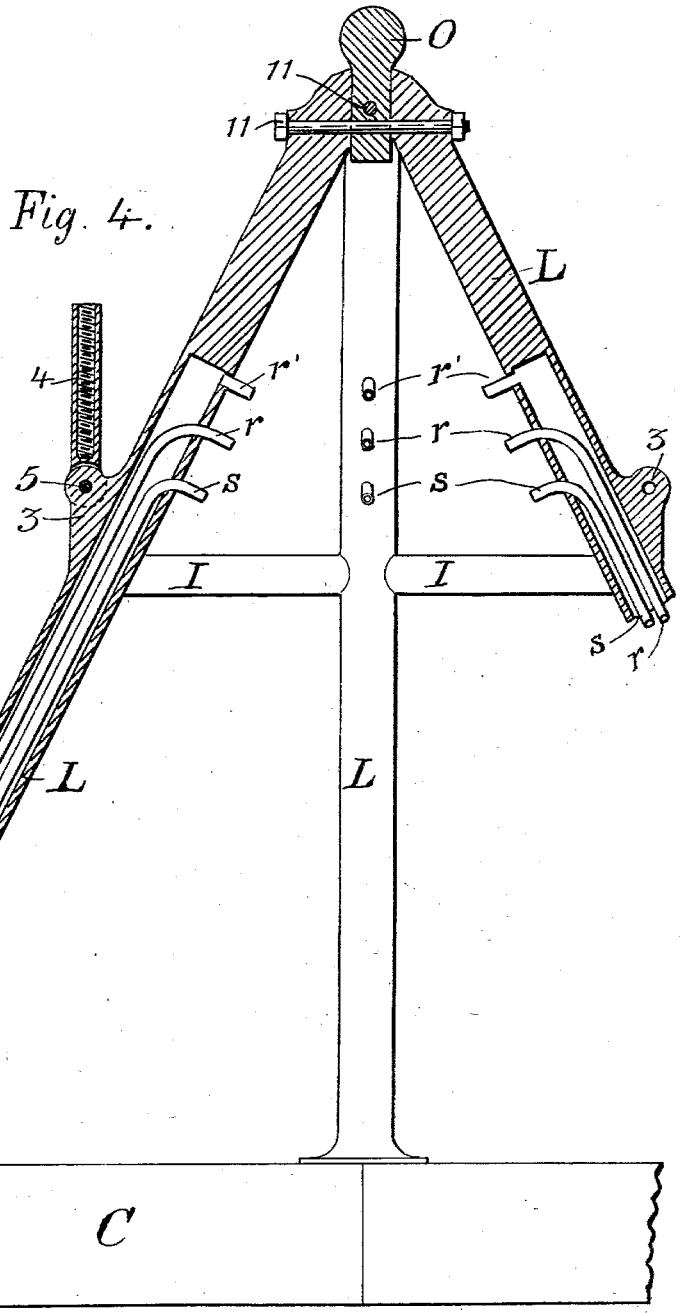
Figure 5:
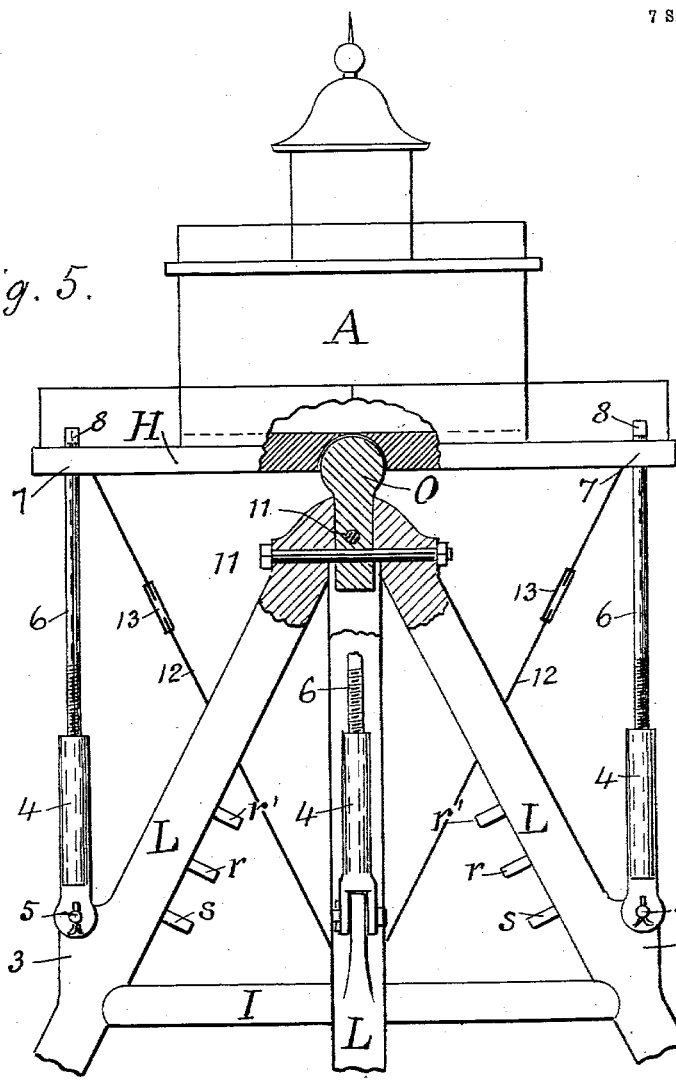
Figure 6:
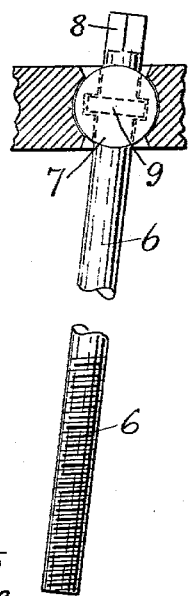
Figure 7:
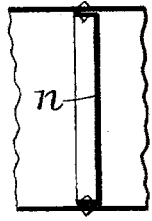
Figure 8:
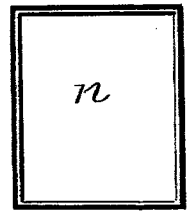
Figure 9:
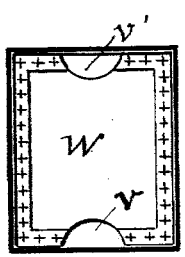
Figure 10:
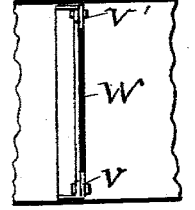
Figure 15:
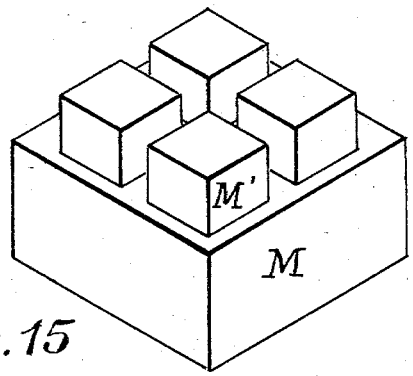
Figure 16:
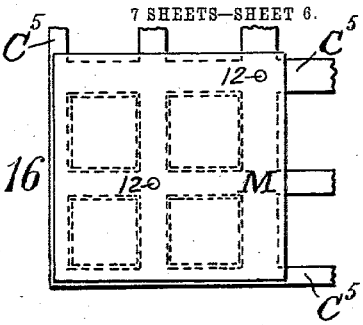
Figure 17:
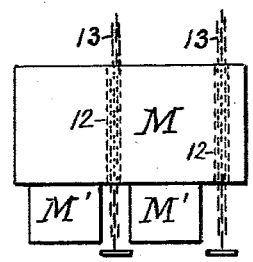
Figure 14:
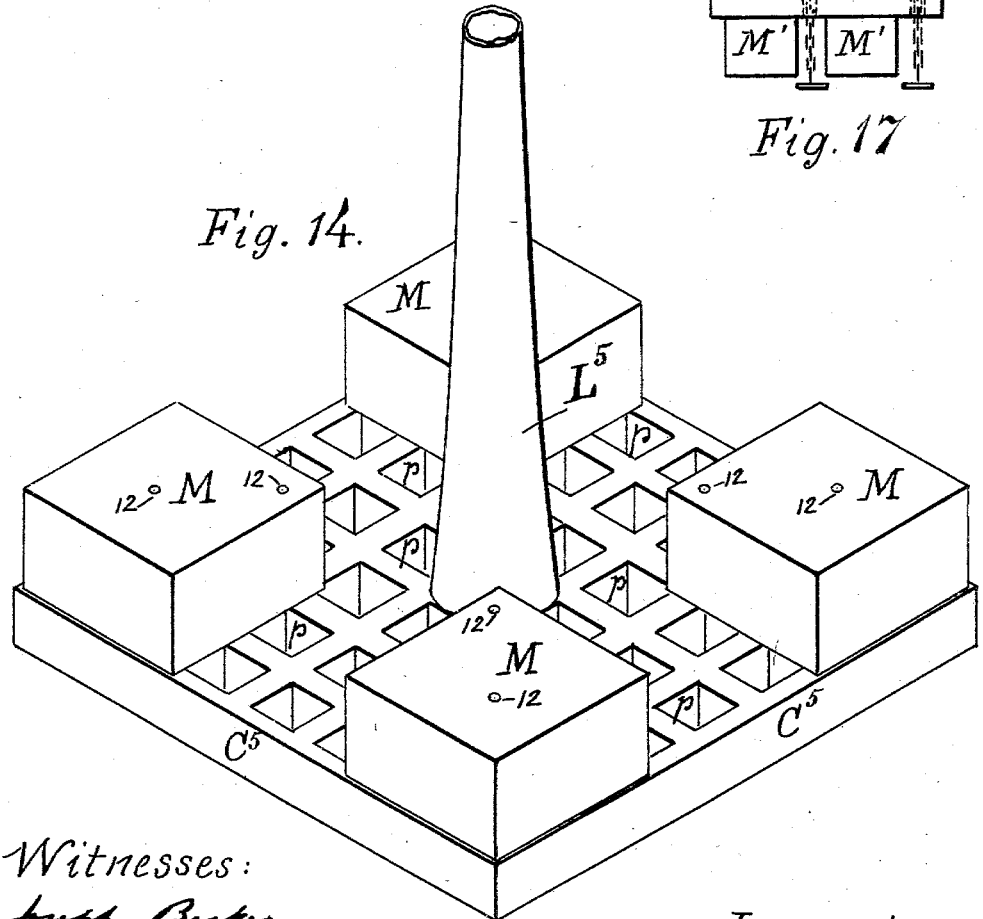

In the accompanying drawings, in which similar characters refer to similar parts, Figure 1 is an elevation of a completed refloatable light-tower in which the rigid part of the structure has its footing embedded in and flush with the sea-bottom and in which the adjustable part of the structure has been leveled by angular adjustment to make its flooring and parts supported thereon level and plumb. Fig. 2 is an elevation of the rigid substructure with the adjustable superstructure and adjusting connections removed, the normal position of the removed parts being indicated in dotted lines. Fig. 3 is a plan view of the rigid substructure, parts being broken away in places to show the internal construction. Fig. 3' is a vertical sectional view of a block of removable ballast or kentledge in position in a pocket of the footing. Fig. 4 is a partial enlarged sectional view of the rigid substructure on line IV of Fig. 3. Fig. 5 is an enlarged detail view of the adjustable trusswork connection between the rigid substructure and the relatively adjustable superstructure. Fig. 6 is an enlarged detail view showing how the leveling-screws are connected with the superstructure. Figs. 7, 8, 9, and 10 are enlarged detail views of the permanent bulkheads and the removable partitions. Fig. 11 shows in elevation a modified form of rigid substructure in which the footing is continuous and the projecting part a plain tower or pier having a broad upper surface to receive the superstructure. Fig. 12 shows in plan a third form of rigid substructure having an open-work or grillage footing and two projecting parts or piers to receive any suitable superstructure. Fig. 13 shows in plan a fourth form of rigid substructure having also a grillage footing specially adapted for wharves and the like, but in which the tower or pier takes the form of a number of piles. Fig. 14 is a perspective view of a tower and its grillage footing, with auxiliary floats at the four corners of the footing. Fig. 15 is a perspective view of one of the floats inverted. Fig. 16 is a top plan of one corner of the footing with the float in place thereon. Fig. 17 is an elevation of one of the auxiliary floats, showing chains for attaching the same to the footing. Fig. 18 is a sectional elevation of a modified form in which the rigid part comprises a footing of special construction and the whole of the superstructure, with the exception of the floors, which are severally adjustable. Fig. 19 is an inverted plan view thereof. Fig. 20 is a vertical section, on an enlarged scale, showing a floor and how it is adjusted. Fig. 21 is an inverted plan of parts shown in Fig. 20.

In the structure shown in Figs. 1 to 10, C is a low extended base or footing in the shape of a large grillage, the girders of which are hollow and of sufficient buoyancy to float the rigid and the adjustable parts of the complete structure, as well as any pumps or other machinery that may be required to float the structure and to ground it. The corner-pockets $p$ of the grillage, Fig. 3, have lugs $t$ at their lower edges. These serve to hold and support solid ballast K', Fig. 3', which is molded into blocks to fit the pockets, each block being provided with suitable hooks K'' to permit of lifting it into and out of place, even when the footing is under water. If the ballast is of iron, lugs $t$ alone are sufficient; but if it be of concrete or stone I use removable cleats or bars $t'$, as shown, in the upper left-hand pocket. The blocks of ballast should just fill the pockets to be flush with the upper surface of the footing. Such ballast is not added until the structure has reached its final place of erection and is not then used unless needed, as will be explained later in describing the method of erection. At the four corners of the footing are attached chains $f$, the use of which will be explained later. The interior of the hollow footing is divided into four independent air-chambers $G'$ $G^2$ $G^3$ $G^4$, Fig. 3, by eight air-tight bulkheads $n$. (Shown in Figs. 7 and 8 on enlarged scale in elevation and in section.) Within each one of the four chambers are distributed a number of partitions $w$, which are also shown on an enlarged scale in elevation and in section in Figs. 9 and 10. These partitions $w$ are open below at $v$ and above at $v'$ and are fastened in place by bolts, so they may easily be removed and replaced by workmen within the chambers. Each chamber has a manhole normally closed by a bolted-down cover $u$. So long as the footing is not submerged any one of its chambers may be entered through its corresponding manhole, and any part of a chamber can be reached on the inside by removing those of its partitions $w$ which happen to be in the way. Partitions $w$ should, however, always be replaced, because they serve to stiffen the girders and prevent collapsing of the chambers and also because they serve to check any sudden displacements of water and prevent it from moving bodily about within a chamber in synchronism with the rolling and pitching of the structure. No water is introduced into the footing until it is to be sunk and grounded; but the structure may roll and pitch while sinking and it may take water while floating if accidentally stove or simply by leakage. Each one of the four chambers has rising therefrom a hollow column L, which is firmly fixed (see Fig. 4) at its lower end to the footing C and at its upper end by bolts 11 to the neck of a spherical head O, which is thus firmly held on trusswork in fixed relation to the base C. On head O rests a platform or gallery H. This gallery, Fig. 5, has a socket to engage with the head O and to form therewith a universal joint, which permits of inclining gallery H in any direction with respect to footing C. Each one of the standards L has a perforated lug 3, through which passes a pin 5, and on each pin 5 is hinged a hollow bar 4, the inside of which is screw-threaded to receive a screw 6. The four screws 6 extend up through the gallery H and are squared at the upper end 8 to permit a man standing on the gallery H to turn the same. They are jointed to the gallery by means of a cylindrical or spherical bushing 7, within which they are secured to a collar 9, so as to be free to turn, but not free to slide longitudinally. By turning opposite screws on one diagonal in opposite directions the platform H can be tilted on the other diagonal as an axis, and by thus tilting platform H first on one diagonal and then on the other it can be set in any desired inclination with respect to the footing or base C. When the platform H has thus been set horizontal, it is further secured with braces 12 by means of turnbuckles 13. Rods 12 act principally to prevent twisting movements and are not required except as a precaution. On platform H is erected the lighthouse proper, A. The standards L are connected by interties I, which serve as stiffeners of the structure and which are also adapted to support a temporary platform upon which are to be mounted pumping and other machinery that may be required in erecting the structure, and for this reason interties I should be placed well above water-level. In each of the columns L, Figs. 4 and 3, are two pipes $r$ and $s$. Pipe $r$, which is the air-pipe, leads from above the platform on I down through the standard L, then outward along the ceiling of its chamber to the extreme outer end thereof, where it is open. Pipe $s$, which is the water-pipe, leads also from above platform on I down through the standard L, then along the bottom of its chamber to open at its extreme outer but lower end. It would be well to have similar air and water pipes for every end of each chamber to be sure of removing every particle of air or of water at any inclination of the footing; but one extra air-pipe for each chamber is sufficient and can easily be provided by the simple addition of a fitting $r'$ in each of the four columns L. This fitting $r'$, with its column, serves for the escape of air from that part of the chamber which is immediately below the column. By opening vents $r$ and $r'$ of a chamber it can be completely filled with water at almost any inclination.

The process of erection involves steps which follow in the same order as the corresponding steps set forth in my patent above referred to. The structure is preferably built complete, as just described, and is launched. As it has no openings lower than the interties I, it can take no water and will float. On the interties I are now fixed the temporary platform, pumps, and other machinery and the structure is towed to the final place of erection. The free ends of the chains $f$ are fastened either directly or indirectly to anchors, and the structure can thus be held exactly over the place of grounding. Water is then pumped into the chambers of the footing C through pipes $s$ and the structure sinks to the bottom. The grounding or sinking is much facilitated by the presence of the openings or pockets $p$; but even an open-work footing has a tendency while sinking through the water to shoot off on a slant, a property which is peculiar to my type of extended footing foundations and which I counteract by the use of chains $f$, as just explained. If the bottom is flat and solid, the footing simply settles thereon. The foundation, owing to its great lateral extent, is then as firmly established as it ever need be, and the platform H can be set and leveled by turning screws 6 as indicated above. When the platform has been leveled, the braces 12 are set and tightened. If the bottom is hard and has irregular projections, it will be necessary to remove them, which can be done after the structure has been grounded by working through openings $p$. If the bottom is soft and scourable and there is enough current, the structure will automatically sink therein; but the sinking, if left entirely to itself, might be too uneven. I therefore prefer to control the automatic sinking, and this I do by removing water from those parts of the grillage that have sunk as much as desired and adding water or other ballast to those that must sink farther. If the water ballast be not sufficient for this purpose, I add kentledge in pockets $p$; but the water ballast near the edge of the footing, combined with the buoyant action of air near the opposite edge, generally provides ample righting stress, principally because the righting forces, though relatively small, act with the immense leverage due to the great horizontal extent of the footing, and thus efforts which with the relatively narrow foundation of the old practice would be inefficient are by my system made highly-important auxiliaries in the process of erection. For the completed structure I need no heavier ballast than water, which just annuls the buoyant effect of the chambers containing it, so the only effective weight of the foundation is equivalent to that of the metallic shell minus the water displacement, which is virtually the same as the volume of the solid metal. The metallic shell acts as a stable foundation mainly because of its great horizontal extent and because it is established at or near the surface of the submerged soil. However, after the footing has been sunk as much as desired I prefer to fill all pockets $p$ with kentledge. This, as before stated, adds weight, and therefore stability, to the structure and makes the footing virtually continuous, so no further scouring action can take place in openings of the footing however large these may be. Where the openings in the footing are relatively small—that is, small as compared with the height of the footing—there can, as explained elsewhere, be no danger from scour. Every winter the structure can, if desired, be refloated and towed to a safe anchorage, to be brought out again and resunk for the opening of navigation. To refloat the structure, the ballast in openings $p$, if any has been used, is removed, the water is withdrawn from the footing by pipes $s$, and air is admitted by pipes $r$ and $r'$. A common suction-pump, hand or power operated, is used to pump the water into and out of the footing. If the height to which the water has to be raised exceeds the limit to which a suction-pump will work, the pump is aided or may even be superseded by forcing compressed air through the air-pipes to drive out the water; but this necessitates more elaborate and expensive means. If the footing is firmly embedded in the soil, it may not have sufficient buoyancy to disengage itself. In this case refloating is facilitated by traction exerted on chains $f$. In resinking the structure no precautions need be taken to set the base exactly as it was before, because the platform H can always be releveled by proper manipulation of the screws 6. The base can always be brought into any desired position by making it partially buoyant and dragging it along the soil by means of chains

*f*. This is a far preferable and more certain method of procedure than to entirely refloat. It is evident that the inlet and outlet of air and water could be more directly made than by pipes *r* and *s*—for instance, by providing the floors of the chambers with valves similar to those shown at $r^2, s^2, r^3, s^3$, and $r^4 s^4$ in Figs. 11, 12, and 13; but such valves are subject to become fouled and could not well be closed again in cases where the structure would have to be refloatable. Solid columns could then be used in place of the hollow columns L. Any desired degree of stability can be obtained by horizontally extending the footing, and as the extension can be made by adding chambers or by extending the original chambers stability and buoyancy can both be increased at will and at the same time. Moreover, as the foundation is not sunk to any great depth the structure can after completion be raised by its own buoyant power. My beacon therefore unites in itself the advantages of a permanent structure with those of a purely movable one, and although it is common to refloat caissons and similar parts of foundations this, under the old practice, can only be done during the process of erection, before completion. I certainly am the first to make a completed structure that can be established as a permanent structure by simply admitting water and then at any time after completion be raised by its own buoyant power. When the bottom is even and solid, or when it is scourable and contains no obstructions that might prevent sinking into the soil, the footing could be continuous and in every respect like the base shown in Fig. 11, described later; but it is better, as a general rule, to make it of open construction, as I have shown it in all the other forms—that is, with openings passing vertically through the footing. An open footing is more easily grounded, is more rapidly embedded by scour, and has a better hold on the ground, and when sunk into the soil it is perfectly secure against undermining, because the size of a scouring-whirl and its range of action in an opening of the footing are both limited by the size of such opening. An open-work footing also has the advantage that any boulders or other obstructions that might prevent the footing from firmly seating itself can be got at through the openings and removed without entirely refloating the structure. In footings that have separate air-chambers the removal of such obstructions can further be much facilitated by tilting the structure on one edge of the footing, as a hinge, and this is easily done by filling the chambers which are farthest from such edge with air.

In the form just described, Figs. 1 to 10, I show a pivotal connection between the footing and the part to be finally supported; but it is obvious that any means that permits of establishing a platform in horizontal position upon a leaning substructure comes within the spirit of my invention. For a structure of given height all that is added to the substructure is so much taken off the superstructure and is a step toward solidity, and therefore I make the substructure in all cases as high as practicable and preferably so that it reaches well above the water-line when it has been grounded. This substructure, then, to quote from my first application, is "a rigid structure higher than the level of the water in which it is to be finally erected and comprising a tower or pier with a footing extended laterally at the level of the sea-bottom." The footing in this application may therefore, as in my said prior application, be of any form and of any detail construction, according to whether it is to be buoyant or not buoyant and according to whether it is or is not to be sunk into the soil after grounding, and if it is to be sunk into the soil then according to the manner in which it is to be so sunk. The tower or pier part of the rigid substructure also may be of a great variety of different forms and either uni or multi columnar. One of the simplest forms of substructure is shown in Fig. 11, where the footing is a plain airtight chamber $C^2$, having rigidly fixed thereto, by means of bolts *d*, a stone pier $L^2$. The chamber has air-valves $r^2$ and water-valves $s^2$. All valves are closed before the structure is launched, and all are opened when it is to be sunk and grounded. Floating and grounding are thus accomplished without pumps or machinery of any kind, except the means required for launching and for towing. After the structure has been grounded and has settled it will generally have a list. The top surface of the pier $L^2$ should therefore be leveled true before the superstructure can be added. Subsequent uneven settling can be provided for by wedges or by screws for changing the inclination of the adjustable superstructure to the rigid substructure. As stated above in connection with footing C of Fig. 1, valves so near the soil as valves $r^2$, and especially $s^2$, are apt to become clogged and might not work in case the structure had to be refloated, and therefore I prefer to not use such valves, except where it is certain that the structure once grounded shall not have to be raised again. Where the footing is to be sunk into the soil and the plenum process is not used, a continuous footing, such as shown in Fig. 11, is not to be recommended, because any obstructions, such as a boulder and logs 1 2 3, could not be removed without refloating the structure and might hold up the footing while the soil was being eaten away around them. This would not necessarily endanger the structure; but it would introduce an element of instability which should be avoided. I therefore prefer to use a footing having openings passing vertically therethrough and giving direct access to the bottom for cutting away, scooping, or otherwise removing any objects or soil which might interfere with or retard the automatic sinking operation, and therefore all footings except those that are to be sunk by the plenum process I preferably make of open construction, the most convenient form being that of a grillage. The grillage may be of solid girders, or it may be of hollow girders, and in the latter case it can be made sufficiently buoyant to permit of dispensing entirely with auxiliary floats. That part of the substructure which is rigidly connected with the footing to project from the footing upwardly to a level above the waterline may, as in the other cases, be of any construction and either uni or multi columnar.

In Fig. 12 I show a form of substructure which comprises two columns or piers $L^3$ $L^3$ and a grillage footing $C^3$, the girders of which are hollow and have air-valves $r^3$ and water-valves $s^3$. This substructure can be floated and grounded in the same manner as the structure of Fig. 11 without any pumps, machinery, auxiliary floats, or apparatus of any kind except such as may be required for towing and launching. Arrows 50 represent the current supposed to be constantly in the direction indicated. As scour in this case would extend farther upstream than down, the footing is made to extend farther upstream than down to correspond. Sinking of the footing into the soil on the down side may have to be aided by working the soil through the pockets of the grillage.

In Fig. 13 I show a grillage foundation having a number of columns or pile-like props $L^4$. This type of substructure is specially intended for wharves and the like, as indicated by the proximity of the shore-line X and the fact that the shore side of the grillage-girders appears in the figure. The submerged soil is supposed to slope off to the right, and the piles $L^4$, therefore, must be gradually longer, as they are farther out, and they must also be inclined with respect to the footing, so they shall be vertical when the structure is grounded. For this reason the piles $L^4$ are seen end on in the figure, while the footing is seen on the slant. The dimensions of the piles are made to conform approximately to the natural slope of the ground, supposing the same to be uniform, and these piles are properly braced in all directions by braces $z$ to secure rigidity. When the structure has been grounded, the piles can be finely adjusted in length to present a level support for the deck or superstructure. I prefer to use longitudinal adjustable piles that operate on the same principle as the stays 4 6 of Figs. 1, 5, 6, although the lower female member would in this case be rigidly connected with the footing. The footing in this type would usually be made of solid girders and would have to be floated with auxiliary floats. In the drawings, however, I show it as made of hollow girders with air-valves $r^4$ and water-valves $s^4$, in every respect similar to the footing of Fig. 12, and to be floated and grounded in the same manner. Where the grillage is made solid or where it is made hollow, but of insufficient displacement, I provide auxiliary floats. How these are shaped, attached, and used is seen in Figs. 14 to 17.

In Fig. 14 the substructure shown comprises a solid grillage footing $C^5$ with a unicolumnar pier $L^5$. The substructure is floated by means of four floats M, each of which has on its under face tenon-like extensions $M'$, adapted to fit into the openings of the grillage, so as to be secured against lateral displacement. Through each float are two openings 12 for the passage of chains 13, which are attached to the footing at points which register with the openings 12 in the floats. On each float is mounted a windlass or other equivalent means (not shown) for tightening the chains and holding the floats securely clamped to the footing and also permitting of easily and quickly freeing the floats when the structure is to be grounded. It is obvious that the use of floats, such as M, is entirely independent of the kind, form, or material of the tower or pier.

While the open or grillage type of foundation is especially adapted to the method of erection disclosed in the present application—that is, to footings which are to be established substantially parallel with the surface of the natural bottom—it is just as useful in connection with the method of my first application wherever the righting of the structure does not involve difficulties of excavation. Thus a grillage foundation with a wholly rigid superstructure can perfectly well be used where the natural bottom is nearly level, or when it has been graded before the structure is grounded, or again where the soil, however much inclined, is such that it can easily be worked out from under the girders of the grillage by excavating with suitable devices between the said girders. A grillage footing with a wholly rigid superstructure is shown in Figs. 18 and 19. The footing $C^6$ tapers gradually from the center toward the periphery, so as to form a base of about uniform strength and permit of giving the base the greatest possible horizontal extent with the least amount of material. The base is formed of hollow girders and is divided by air-tight bulk-heads $n^6$ into four independent chambers $G^{11}$ $G^{12}$ $G^{13}$ $G^{14}$. Each chamber has an air-pipe $r^6$ and a water-pipe $s^6$, as shown in dotted lines for chamber $G^{11}$, leading from the farthest end of the chamber inwardly and then upwardly in the tower $L^6$ up through a platform N, which is preferably above water-level. At the inner end each air-chamber has a similar set of air and water pipes. (Not shown in the figures.) Each of the closed chambers $G^{11}$ $G^{12}$ $G^{13}$ $G^{14}$ communicates with a central open-bottom chamber or bell vestibule D by means of a manhole which may be hermetically closed by a door $g$, mounted so it may be opened from either side, and the locks on these doors are further provided with rods, (indicated in the figures by dotted lines $g'$,) which rods are led to any part of the structure from which it may be found desirable to unlock the doors. Leading upward from the vestibule D is an air-shaft $a$, made not wider than required to admit materials and men, and in which is fixed a ladder $l$. At the upper end of the shaft $a$ is an air-lock E, which opens onto platform N. On platform N are mounted pumping and other machinery that may be required to work the air-chambers. One of these pumps is an air-pump, which is permanently installed to serve later as air-compressor for the fog-signal. The pumps and machinery being of the ordinary kind are omitted from the illustrations. Between shaft $a$ and the inner wall of the tower is a space $b'$, which is used for storing solid ballast. Parts N E D $l$ $a$ $g$ are substantially the same in structure and in function as the similarly-lettered parts in my copending application Serial No. 126,272. The pipe $r^6$ is also substantially the same as pipe $k$ of the same application; but I have lettered it $r^6$, because it works here in connection with pipe $s^6$. Space $b'$ differs from space $b$ of the said pending application in that no provision is made for filling it with water from below. It is really intended to hold nothing but solid ballast. The chambers are subdivided into communicating cells by partitions. (Not shown in this figure, but similar to partitions $w$, shown in Figs. 9 and 10.) Losses of air through leakage are compensated for by working the air-compressor. Within the tower are four adjustable floors $c$, upon the upper one of which is mounted the lenticular apparatus $y$. Under each floor the inner wall of the tower has attached thereto four brackets $4'$, each of which is threaded to receive a screw $6'$. The four screws $6'$ are operated in the same manner as the corresponding screws 6 of Fig. 1 to level the floor that is supported thereon. The structure, including footing-tower, floors, pumping, and other machinery, is preferably built complete at any convenient place of construction and then towed to the final place of erection, where it is grounded by opening all the air-pipes and all the gates $g$. Water fills the footing and the structure sinks to the bottom. If there be any scour, the footing will slowly sink into the soil; but the sinking will generally be irregular—that is, it may stop when one edge of the footing has been embedded while the other is still projecting, as shown in Fig. 18. When this occurs, the floors may be leveled and the light-house may be regularly used; but it is safer to not allow the footing to be sunk so unevenly, especially as the sinking can in great measure be controlled by buoying up those parts of the base that have sunk as much as desired and ballasting those that require to be sunk farther. Thus to cure the list shown in Fig. 18 all chambers to the right should be ballasted and all those to the left made lighter. The water is first driven from chamber $G^{12}$, which is then loaded at its extreme outer end with kentledge and refilled entirely with water. The same is done with chamber $G^{13}$, but not at the same time, because to empty both chambers at the same time might make this side of the footing too buoyant. Chambers $G^{11}$ and $G^{14}$ are then partially or entirely filled with air, and the structure is left to righten itself automatically, which it will do to within a few degrees unless stopped by some obstruction, which can be removed through pockets of the grillage in the manner before explained. When the footing has been embedded in the soil and settling has ceased to be appreciable, the footing is filled with solid ballast to affirm its seat and the floors $c$ are again leveled.

In conclusion it may be well to state that the removable ballast which I use is only necessary to secure differences of load in different parts of the footing and that as much metal as possible should be put in the footing itself to be used in giving the footing the greatest possible lateral extent; also, that when the footing has considerable extent the tower or pier part of the structure may be considerably widened without fear of spreading scour to the edge of the footing. There is no object in making the tower wider than necessary for interior room and for strength; but it is well when practicable to connect the tower and the footing by an easement, such as indicated in Fig. 18. The size of the easement will depend upon conditions. If current and scour be small, this easement can be increased to extend to the extreme edge of and itself constitute the footing.

What I claim as my invention, and desire to secure by Letters Patent, is—

1. A beacon or similar marine structure comprising a signal, a tower or pier to support the signal, means for angularly adjusting the signal on the tower or pier, a footing rigidly connected with the tower or pier and having closed chambers formed therein, and pipes leading from the chambers upward to open above the water-line when the structure has been finally erected.

2. A light vessel adapted to be sunk for use and having a mast or masts reaching above the water in which it is to be sunk, a beacon mounted upon the said mast or masts, and means for adjusting the said beacon angularly with respect to the said mast or masts and hull.

3. A marine structure provided with a submerged foundation extending laterally therefrom at substantially the surface-level of the submerged ground and having openings passing vertically therethrough.

4. A marine structure provided with a submerged grillage foundation extending laterally therefrom at substantially the surface-level of the submerged ground.

5. For marine structures, a foundation having the general shape of a grillage, auxiliary floats adapted to be temporarily attached to the grillage to increase its buoyancy.

6. For marine structures, a foundation having the general shape of a grillage with the girders of the grillage made hollow to form closed air-tight chambers.

7. The combination with a marine structure supported on columns, of an extended base connecting the said columns substantially at the level of the submerged soil.

8. A marine structure comprising columns extending from the submerged soil up above the water-level, an extended base connecting the said columns substantially at the level of the submerged soil, and a structure angularly adjustable with respect to said columns and base.

9. A marine structure having a laterally-extended footing with openings passing vertically through said footing, of removable ballast shaped to fill the openings, and lugs attached to the base at the bottoms of the openings to retain the ballast within the openings so that the upper surface of the ballast shall be flush with the upper surface of the footing.

10. The combination with a marine tower or pier of an integral submerged foundation extended at or near the natural surface of the submerged soil and having formed therein chambers adapted to be filled either with water or with air and proportioned to refloat the complete structure, when filled with air.

11. A marine tower or pier having an integral base extended laterally at or near the surface of the submerged soil with a closed chamber or chambers formed in said base and pipes leading from said chamber or chambers to a point or points above the water-line whereby the chambers may be filled either with water to hold the structure grounded or with air to refloat the same.

12. The combination with a marine tower or pier of an integral base extended laterally at or near the surface of the submerged soil with a closed chamber or chambers formed in said base and ducts leading from said chamber or chambers to a point above the water-level.

13. The combination with a marine tower or pier of an integral base extended laterally at or near the surface of the submerged soil with a closed chamber or chambers formed in said base and ducts leading from said chamber or chambers to a point above the water-level, each chamber having its own independent ducts.

14. In a marine structure the combination with a foundation part having its under surface inclined approximately parallel to the natural inclination of the sea-bottom, of a superstructure and means for angularly adjusting the same with respect to the foundation, whereby the said superstructure may be set and held in a righted position.

15. A light vessel adapted to be sunk for use and having a mast or masts reaching above the water in which it is to be sunk, a signal mounted upon the said mast or masts, and means for adjusting the said signal angularly with respect to the hull of the said vessel.

16. In a marine structure the combination with a foundation part of a superstructure part universally jointed thereon and adjustable members connecting the said parts to hold them in desired angular relation.

17. The combination with a marine structure having a laterally-extended footing with openings passing vertically through said footing of removable ballast adapted to be lodged in the said openings and means for transmitting the weight of the said ballast to the footing.

18. The combination with a tower or pier having a footing extended laterally at or near the surface of the submerged ground of chains attached near the edge of said footing.

19. In a marine structure, the combination with a foundation part adapted to be established without regard to righting, of a superstructure part angularly adjustable with respect to the said foundation part.

20. In a marine structure, the combination with a foundation part established without regard to righting, of a superstructure part angularly adjustable with respect to the said foundation part.

21. The combination with a marine tower or pier, of an extended footing having a peripheral series of closed chambers, each chamber being adapted to be independently filled with air and ballast in any proportion.

22. The combination with a marine tower or pier, of a footing having closed peripheral chambers, said footing being extended horizontally away from the tower or pier to secure great leverage for the vertical forces that act on the chambers.

23. A marine tower or pier having an integral extended footing containing a closed buoyant air chamber or chambers and transverse obstructions arranged at intervals within said closed chamber or chambers and adapted to prevent any water that may be contained in the footing from bodily rushing about in synchronism with the oscillations of the structure.

In testimony whereof I hereunto affix my signature in the presence of two witnesses.

EDMUND BECKER.

Witnesses:
MARY E. COWELL,
JOSEPH BECKER.